United States Patent
Bauer

Patent Number: 5,820,363
Date of Patent: Oct. 13, 1998

[54] APPARATUS FOR THERMAL PROCESSING OF RAW MATERIALS IN DUST FORM

[75] Inventor: Claus Bauer, Köln, Germany

[73] Assignee: Deutz Aktiengesellschaft, Cologne, Germany

[21] Appl. No.: 562,982

[22] Filed: May 6, 1997

[30] Foreign Application Priority Data

Dec. 1, 1994 [DE] Germany .................. 44 42 703.4

[51] Int. Cl.$^6$ .................................................. F27B 7/02
[52] U.S. Cl. .......................... 432/106; 432/77; 432/78
[58] Field of Search .......................... 432/77, 78, 106

[56] References Cited

U.S. PATENT DOCUMENTS

| | | | |
|---|---|---|---|
| 3,469,828 | 9/1969 | Lane | 432/77 |
| 3,837,792 | 9/1974 | Deussner | 432/77 |
| 4,014,642 | 3/1977 | Helming | 432/77 |
| 4,076,493 | 2/1978 | Gardner | 432/77 |
| 4,170,183 | 10/1979 | Cross | 110/282 |
| 4,474,524 | 10/1984 | Kawakami et al. | 432/77 |

OTHER PUBLICATIONS

Cover and pp. 3 and 4 of brochure No. 7–330 KHD Humboldt Wedag AG.

Primary Examiner—Teresa J. Walberg
Assistant Examiner—Jiping Lu
Attorney, Agent, or Firm—Charles L. Schwab; Hardaway Law Firm P.A.

[57] ABSTRACT

A cement clinker manufacturing installation a rotary kiln (10) having secondary firing and a grate cooler (16) with a high degree of heat recuperation. Instead of placing the grate cooler (16) in-line with the rotary kiln (10), the grate cooler (16) is positioned with its clinker transport direction (16a) transverse to the longitudinal axis of the rotary kiln (10). This angular positioning of the grate cooler (16) permits a discharge of hot air from the grate cooler as combustion air for the secondary firing of the calcination state by way of a discharge opening (20 or 21) on the lateral half of the kiln discharge housing (11) in which the beginning of the recuperation zone of the grate surface (15) of the grate cooler (16) is located. Thus somewhat cooler secondary air (18) flows into the rotary kiln (16) thereby avoiding excessively high temperatures at the rotary kiln discharge without reduction in overall thermal efficiency of the cement plant.

5 Claims, 1 Drawing Sheet

APPARATUS FOR THERMAL PROCESSING OF RAW MATERIALS IN DUST FORM

TECHNICAL FIELD

This invention relates to an apparatus for thermal processing of raw materials in dust form, in particular for the production of cement clinker from raw meal. Raw meal is preheated in at least one preheater through which the flue gas of a rotary kiln flows, calcined in a calcination stage supplied with hot air from the clinker cooler and supplementary fuel and, if appropriate, rotary kiln flue gas, and burned to cement clinker in the sintering zone of a rotary kiln. The cement clinker is cooled in a downstream grate-type clinker cooler, having a kiln discharge housing arranged between the discharge end of the rotary kiln and the recuperation zone of the grate cooler. Part of the hot air from the cooler is routed into the kiln discharge housing and into the sintering zone of the rotary kiln as secondary air and another part of the hot air from the cooler serves as tertiary air by being routed to the calcination stage via a tertiary air line.

INFORMATION DISCLOSURE STATEMENT

In installations for the manufacture of cement clinker from cement raw meal, in order to avoid uneconomically long and/or large-diameter rotary kilns, and to keep the specific heat requirement of the cement clinker manufacturing process low, it is known to connect a calcination stage upstream of the rotary kiln as viewed in the direction of material flow, which calcination stage is equipped with a secondary firing (in addition to the firing in the rotary kiln). The cement clinker burned in the rotary kiln, in the glowing hot condition, is discharged downward, via a stationary kiln discharge housing enclosing the end of the rotary kiln, onto a grate cooler that follows the rotary kiln as viewed in the longitudinal direction of said rotary kiln, such as shown in KHD Humboldt Wedag AG Brochure No. 7-330, pages 4 and 5. The grate cooler may also be installed beneath the rotary kiln having its transport direction opposite thereto. In the grate cooler, the hot cement clinker, for example at 1000° C., is cooled by means of cool air. The hot air from the cooler trapped in the kiln discharge housing is utilized in two ways for the cement clinker burning process, namely, in one part, as secondary air for the rotary kiln firing and, in another part, as tertiary air for the second firing in the calcination stage. Because of the previously known geometrical arrangement of the grate cooler relative to the rotary kiln, the combustion air to the rotary kiln (secondary air) is hotter, namely by approximately 50° to 100° C. hotter, than the combustion air to the calcination stage (tertiary air).

In recent years, appreciable efforts have been made to increase the recovery of heat (recuperation) in the grate coolers connected downstream of the rotary kilns by means of improvement of the efficiency of the coolers. This has led to still higher temperatures of the hot secondary air flowing in from the grate cooler via the kiln discharge housing into the rotary kiln. There are, however, several reasons for wanting to lower an excessively high secondary air temperature, which in modern grate coolers may be, for example, about 1100° C. (formerly approximately 800° C.), namely:

At excessively high secondary air temperatures, the refractory materials of the rotary kiln discharge as well as the kiln discharge housing approach the limit of their capacity. A change to materials with higher capacity would drastically increase purchase costs. For these reasons, a reduced temperature stress on the refractory materials of the kiln discharge housing as well as the metallic rotary kiln discharge segments and the burner lance in the rotary kiln discharge zone is desirable.

Excessively high secondary air temperature makes precooling of the glowing hot cement clinker in the rotary kiln discharge zone more difficult and promotes the formation of a melt phase and the formation of deposits in the rotary kiln discharge zone.

Excessively high secondary air temperatures and hence excessively high flame temperatures of the rotary kiln burner promote the undesirable formation of $NO_x$ in the rotary kiln flue gas.

OBJECTS AND SUMMARY OF THE INVENTION

It is a primary object of the invention, in a cement clinker production plant using a rotary kiln having primary and secondary firing and grate coolers with a high degree of heat recuperation, to provide a lower temperature secondary air flowing from the recuperation zone of the grate cooler via the kiln discharge housing into the rotary kiln without it being necessary to cool the excessively hot secondary air with fresh air or infiltrated air, thereby preserving the desired maximum possible heat recovery.

In the cement clinker manufacturing installation in accordance with the invention, having rotary kiln firing, secondary firing in the calcination stage, and a grate cooler, a control of the quantity of secondary air coming from the recuperation zone of the grate cooler and flowing through the kiln discharge housing into the rotary kiln, is made possible with respect to its temperature level, in that the offtake of the tertiary air from the kiln discharge housing (for the secondary firing) is designed such that there is an effect on the secondary air temperature. Specifically, in accordance with the invention, the secondary air and the tertiary air are interchanged, with respect to their temperature level, in comparison with the previously known designs and methods. For this purpose, the grate-type clinker cooler is not progressively aligned with the rotary kiln axis, but instead is positioned so its clinker transport direction is transverse to the longitudinal axis of the rotary kiln whereby the transport direction of the grate cooler makes an angle $\alpha$ of approximately 70° to 150° to the rotary kiln axis. This changes the flow patterns of the recuperation air in the kiln discharge housing. If the offtake of the hot air from the cooler as combustion air for the secondary firing (tertiary air) is installed on the lateral half of the kiln discharge housing in which the beginning of the recuperation zone of the grate surface of the grate cooler is located, then a cooler secondary air is left over for the rotary kiln. The depth of the bed of cement clinker falling, glowing hot, from the rotary kiln discharge onto the grate is greatest at the beginning of the recuperation zone of the grate surface of the transversely positioned grate cooler, and the hottest hot air from the cooler is extracted as tertiary air in this zone. The cooler substream quantity of the hot air from the cooler remains as secondary air for the rotary kiln, the cooler substream having flowed through a clinker bed that has already experienced cooling on the beginning section of the grate, so that the secondary air is cooler than the tertiary air. With the cooler secondary air obtained in this fashion in accordance with the invention, the disadvantages of prior art modern grate coolers can be avoided.

In accordance with the invention, the opening for the offtake of hot air from the cooler as combustion air for the calcination state (tertiary air for the secondary firing) is arranged in the side wall and/or overhead wall of the kiln discharge housing at a point adjacent to the side of the kiln discharge from which the kidney of in-process material is discharged. Also the temperatures of the secondary air and the tertiary air taken from the kiln discharge housing can be influenced by the selection of the direction of rotation of the rotary kiln.

BRIEF DESCRIPTION OF THE DRAWINGS

The invention and its further features and advantages are explained in more detail on the basis of the exemplary example illustrated schematically in the drawings, in which.

DETAILED DESCRIPTION OF THE DRAWINGS

Figure 1:
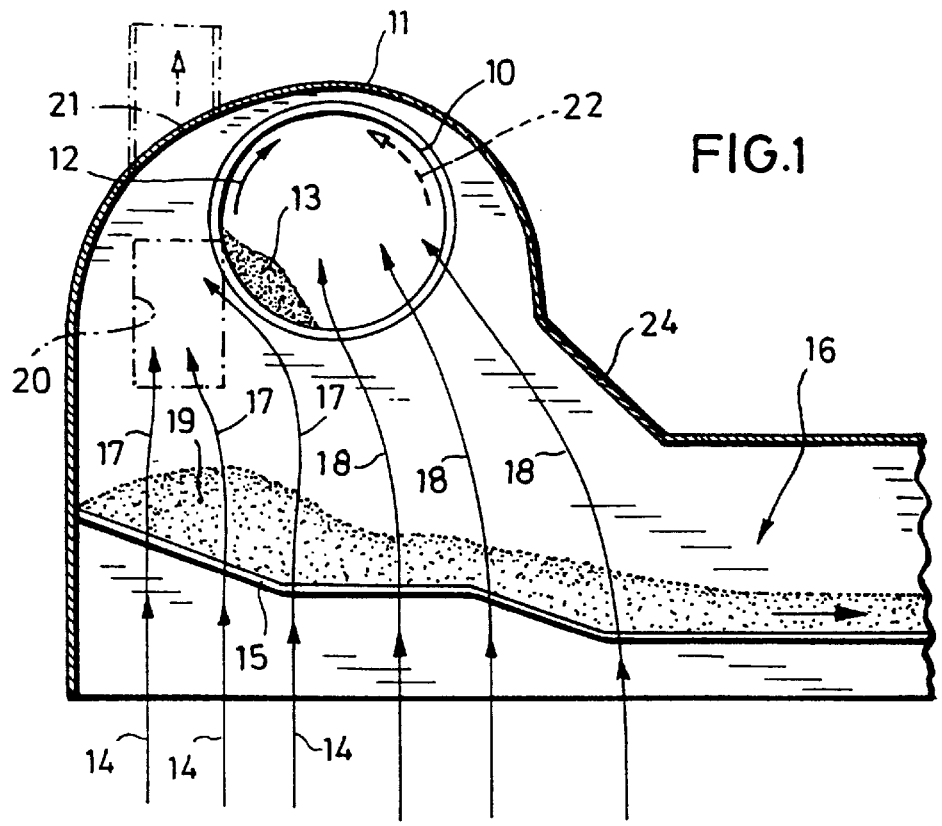
FIG. 1 is a vertical section of a kiln discharge housing arranged between the cement clinker rotary kiln and the grate-type clinker cooler taken along the line I—I in FIG. 2, with a view into the interior of the rotary kiln

Referring to the drawings, the discharge end of the rotary kiln (10) of a cement clinker production plant is enclosed by a stationary kiln discharge housing (11). The rotary kiln (10) rotates in the rotation direction (12), so that the kidney of in-process material (13) is formed in the rotary kiln. From this kidney of in-process material (13), glowing hot cement clinker is discharged onto the beginning of the grate surface (15) of a grate cooler (16), through which grate surface cool air (14) flows. The clinker transport direction (16a) of the grate cooler is transverse to the rotary kiln longitudinal axis such that the grate cooler transport direction makes an angle α of 70° to 150° to the rotary kiln axis. In the exemplary embodiment of FIG. 2, α=90°. The flow lines of the hot air obtained from the cooler in the recuperation zone of the clinker cooler are shown in FIG. 1 as tertiary air (17).

Figure 2:
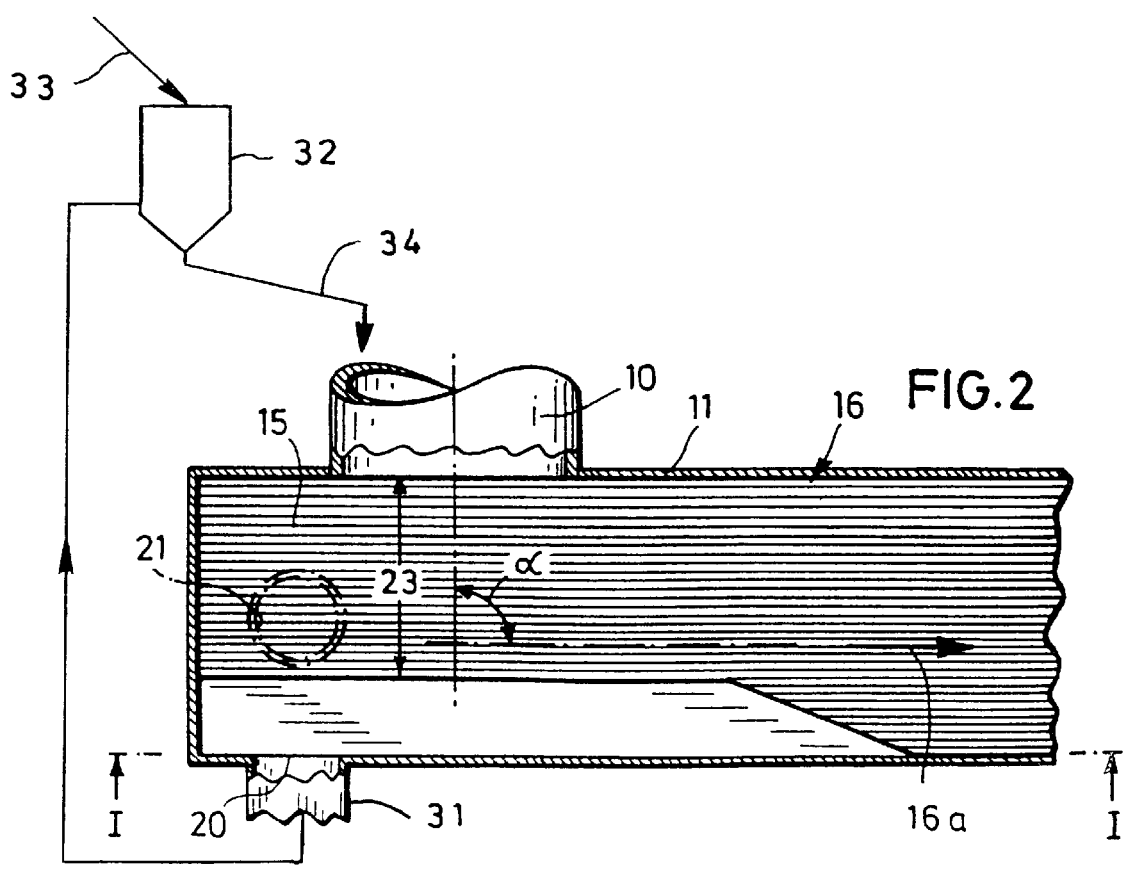
FIG. 2 is a horizontal section through the rotary kiln discharge housing of FIG. 1 with a downward view of the grate surface of the grate cooler.

It can be seen clearly that a discharge opening (20) for tertiary air (17) is installed on the lateral half of the kiln discharge housing (11) in which the beginning of the recuperation zone of the grate surface (15) of the grate cooler (16) is located. Also located there is the greatest bed depth (19) of the glowing hot cement clinker dropping out of the rotary kiln discharge onto the cooling grate; that is, the hottest hot air from the cooler is extracted there as tertiary air (17), so that only the cooler substream quantity of the hot air from the cooler obtained in the recuperation zone of the clinker cooler remains as secondary air (18) flowing into the discharge end of rotary kiln (10). Referring to FIG. 2, the discharge opening (20) for the discharge of the tertiary air (17) via a tertiary air line 31 leading to the second burner stage of a calcinator 32 is arranged in the side wall of the kiln discharge housing (11) at a point adjacent, depending on the rotation direction of the rotary kiln (10), to the kidney of in-process material (13) formed therein. Raw meal, indicated by arrow 33, is calcinated by firing in the calcinator 32 and the calcinated raw meal is delivered from the calcinator 32 to the rotary kiln 10 by line or conduit 34. Alternatively, a discharge opening (21) for the discharge of tertiary air can be formed in the overhead wall of the kiln discharge housing (11).

In accordance with the invention, the control of the temperature level of the secondary air (18) flowing to the rotary kiln firing can also be influenced by virtue of the fact that, according to a further feature of the invention, the first longitudinal section (15) of the cooling grate of the grate cooler, with which the recuperation zone of said cooler begins, is designed variable in tilt to the horizontal. By means of the tilt adjustment, the coverage of the grate with clinker as well as the residence time of the clinker in the first cooler zone is changed. In this way, heat transfer from the hot clinker to the cooling air is also influenced, which cooling air then flows either to the rotary kiln (10) as secondary air (18) or to the second firing of the calcination state as tertiary air (17).

There is also the possibility of rotating the rotary kiln (10) in the rotation direction (22) instead of rotation direction (12) and thus to influence the discharge characteristic of clinker (13) from the kiln onto the cooling grate. Also in this way, the air temperature in the cooler sections of the first cooler zone is influenced.

In FIG. 2 it can be seen that, in the kiln discharge housing (11), the width (23) of the cooling grate in the clinker discharge zone is approximately ⅓ to ½ smaller than in the other longitudinal sections of the grate cooler (16).

Finally, it can also be seen from FIG. 1 that the kiln discharge housing (11) at the transition (24) from its cover to the overhead wall of the grate cooler housing (16) arranged transversely to the rotary kiln (10) is designed or expanded in such fashion that there is no increase in gas velocity at this housing transition (24), by which means the offtake of tertiary air (17) via the discharge opening (20 or 21, respectively) might be hindered.

What is claimed is:

1. In an apparatus for thermal processing of raw meal to produce cement clinker having a rotary kiln rotatable about a longitudinal axis with a clinker discharge end and a calcinator for calcinating said raw meal prior to its being fed to said rotary kiln, the combination, comprising:

a grate type clinker cooler (16) having a predetermined clinker transport direction, said grate type clinker cooler (16) extending in one lateral direction from said clinker discharge end of said rotary kiln whereby said clinker transport direction is at an angle of 70 degrees to 150 degrees to said longitudinal axis, said rotary kiln forming a kidney shaped mass (13) of in process material at a lateral side of said discharge end of said rotary kiln opposite to said one lateral direction when said rotary kiln is rotated in a predetermined direction about said longitudinal axis, said kidney shaded mass being discharged from said clinker discharge end of said rotary kiln directly onto said grate cooler (16), a cover for said grate type clinker cooler (16) including a kiln discharge housing (11) at said discharge end of said rotary kiln through which heated cooling air from said grate cooler passes into the discharge end of said rotary kiln and a hot air discharge opening (20, 21) in said discharge housing (11) connected in hot air delivery relation to said calcinator whereby said raw meal is calcinated by the firing of said hot air prior to delivery of said calcinated raw meal to said rotary kiln, said hot air discharge opening being disposed at said lateral side of said discharge end of said rotary kiln opposite to said one lateral direction, whereby the hot air from said grate type clinker cooler passing to said calcinator is hotter than the hot air from said grate type clinker cooler flowing into said discharge end of said rotary kiln.

2. The apparatus of claim 1 wherein said grate cooler (16) includes a first longitudinal section (15) which is variable in tilt to the horizontal.

3. The apparatus of claim 1 wherein said grate cooler (16) has sections of various widths and wherein the width (23) of said section of said grate cooler (16) at said clinker discharge end of said rotary kiln (10) is approximately ⅓0 to ½ smaller than the width of the other of said sections of said grate cooler (16).

4. The apparatus of claim 1 wherein said cover includes an overhead wall and wherein said kiln discharge housing (11) includes a transition (24) to said overhead wall shaped to prevent an increase in gas velocity at said transition (24).

5. The apparatus of claim 1 wherein said grate cooler (16) includes individually ventilated grate rows facilitating flow of cooling air through said grate cooler (16).

\* \* \* \* \*

UNITED STATES PATENT AND TRADEMARK OFFICE
CERTIFICATE OF CORRECTION

PATENT NO. : 5,820,363
DATED : 10/13/98
INVENTOR(S) : Claude Bauer

It is certified that error appears in the above-indentified patent and that said Letters Patent is hereby corrected as shown below:

Claim 3, line 4, cancel "1/3 O"
and subsitute --- 1/3 ---.

Signed and Sealed this

Twenty-third Day of February, 1999

Attest:

Q. TODD DICKINSON

*Attesting Officer*       *Acting Commissioner of Patents and Trademarks*